May 12, 1970 A. H. HALFF ET AL 3,511,606
PROCESS FOR REMOVING ALUMINATE FROM AQUEOUS
ALKALI METAL HYDROXIDE SOLUTIONS
Filed May 29, 1967 3 Sheets-Sheet 1

INVENTORS
ALBERT H. HALF
ALLEN F. REID
BY
George C. Bower
ATTORNEY

INVENTORS
ALBERT H. HALF
BY ALLEN F. REID
ATTORNEY

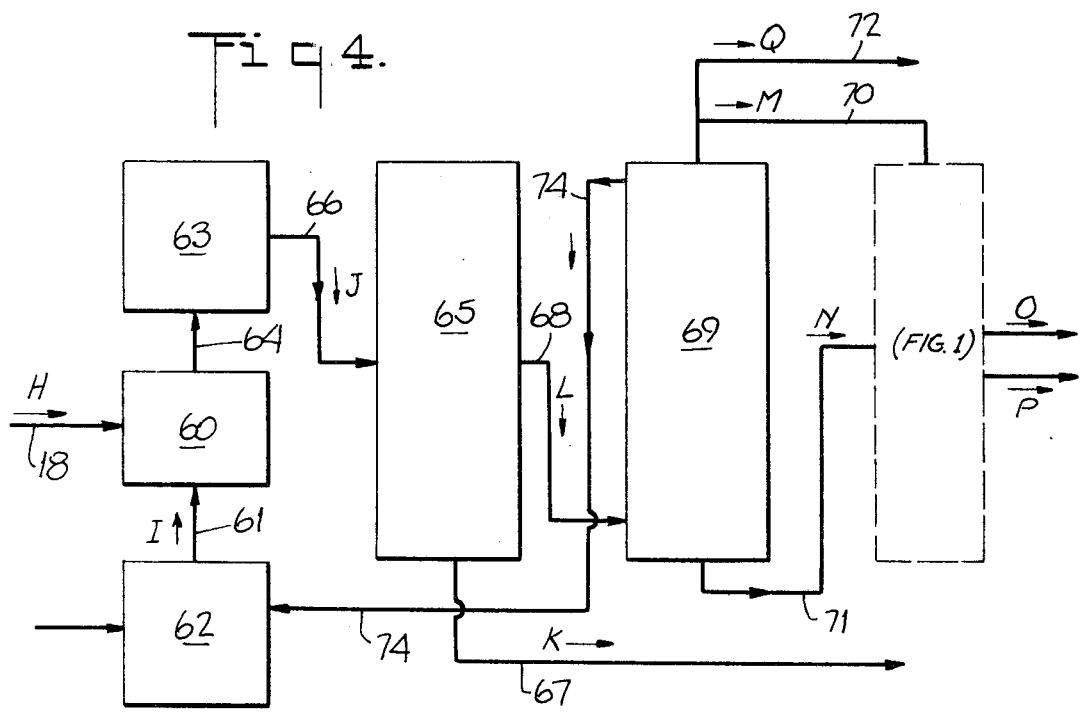
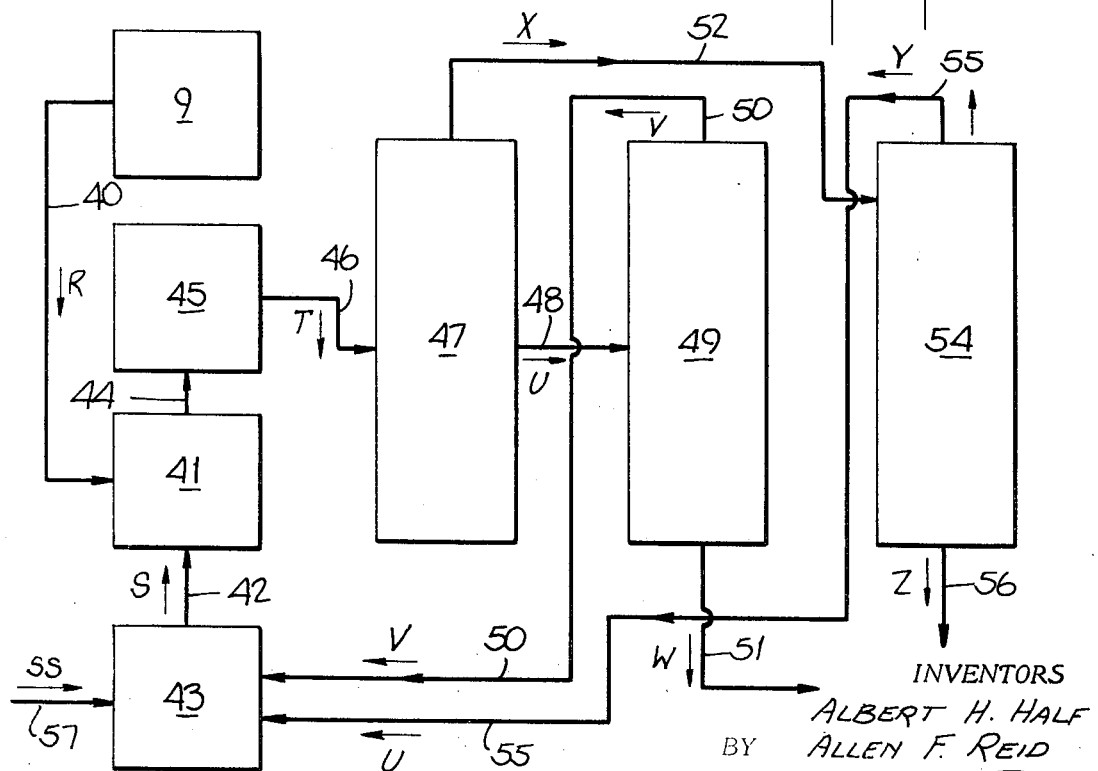

United States Patent Office 3,511,606
Patented May 12, 1970

3,511,606
PROCESS FOR REMOVING ALUMINATE FROM AQUEOUS ALKALI METAL HYDROXIDE SOLUTIONS
Albert H. Halff, 3514 Rock Creek Drive, Dallas, Tex. 75204, and Allen F. Reid, Dallas, Tex. (258 Mill Spring Road, Manhasset, N.Y. 11030)
Filed May 29, 1967, Ser. No. 641,932
Int. Cl. C01d 1/34
U.S. Cl. 23—184       5 Claims

ABSTRACT OF THE DISCLOSURE

Sodium hydroxide is separated from an aqueous mixture of sodium hydroxide and an aluminate by adding ethanol to the mixture and forming a light phase and a heavy phase. The light phase has a high concentration of ethanol with sodium hydroxide and a little of the aluminate. The heavy phase has a low concentration of ethanol with most of the aluminate and some sodium hydroxide. The ethanol is removed from the light phase to form ethanol and the recovered aqueous sodium hydroxide. The heavy phase may be further treated or discarded or the ethanol removed and the remainder further treated or discarded.

Instead of ethanol, methanol may be added to the sodium hydroxide solution with the excessive aluminate. An aluminum hydroxide is formed and precipitates. The precipitated aluminum hydroxide and the methanol are separated from the solution to produce a reusable solution of sodium hydroxide.

BACKGROUND OF THE INVENTION

In chemical processes utilizing sodium hydroxide in an aqueous solution the bath or solution needs to be revitalized as the solution becomes contaminated. In processes such as etching of aluminum by sodium hydroxide or the production of alumina from ores, the aluminum becomes dissolved into the solution in chemical combination as an aluminate. When the concentration reaches a given value, the efficiency of the process decreases to an uneconomic operation. In the past a portion of the solution is removed and discarded. The bath is then supplied with a fresh solution of sodium hydroxide. This is rather wasteful.

SUMMARY OF THE INVENTION

An object of the invention is to provide a process for extracting the contaminated sodium hydroxide solution, removing the contaminating aluminate to recover at least a portion of the sodium hydroxide for reintroduction into the bath.

In the invention the contaminated sodium hydroxide solution is separated from the bath and mixed with ethanol separating the solution into a heavy phase containing primarily the contaminating aluminate and some sodium hydroxide and a light phase containing primarily sodium hydroxide and some aluminate. The heavy phase may be further treated or discarded and the light phase returned to the bath after removal of the ethanol.

Contaminated sodium hydroxide solution is treated with methanol and aluminum hydroxide precipitated. The precitpitated aluminum hydroxide and methanol are separated from the solution of sodium hydroxide which is returned for reuse.

BRIEF DESCRIPTION OF THE DRAWINGS

In the drawings the apparatus for performing the process is diagrammatically illustrated.

FIG. 4 diagrammatically illustrates the recovery of alcohol and sodium hydroxide from the heavy phase of the embodiment of FIG. 1.

FIG. 6 diagrammatically illustrates the recovery of sodium hydroxide used in the Bayer process.

DETAILED DESCRIPTION

Figure 1:
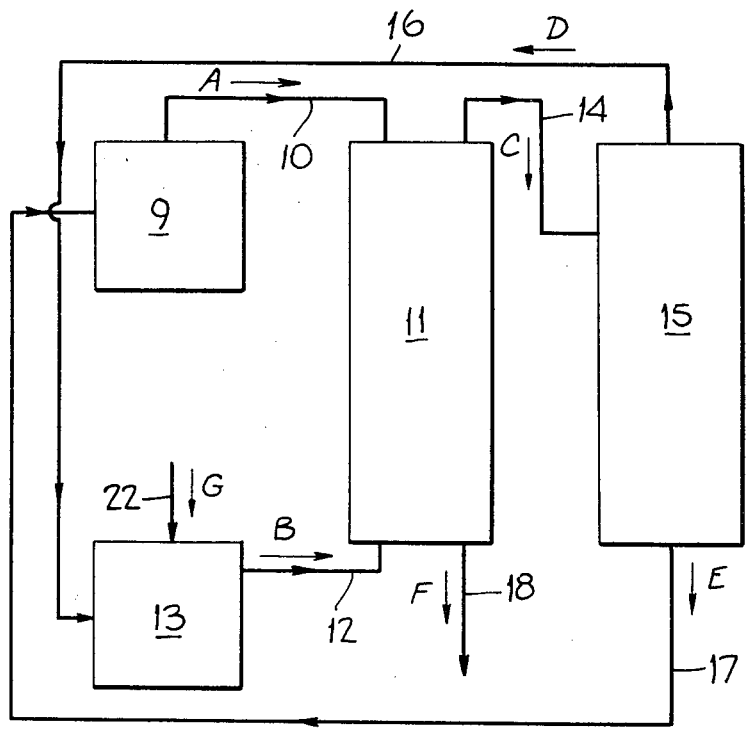
FIG. 1 diagrammatically illustrates the recovery of the ethanol and the sodium hydroxide from the light phase.

Referring to the diagram of FIG. 1 the sodium hydioxide solution A with an excessive amount of aluminate is introduced from the bath 9 by the pipe 10 to the liquid-to-liquid extractor 11. Chart I sets forth the amounts of the constitutents of influents and effluents. Ethanol B is supplied by the pipe 12 from the ethanol reservoir 13. The extractor 11 is vertical and the ethanol pipe 12 is connected at the bottom and the pipe 10 is connected at the top. This produces a counterflow and intermixing of the sodium hydroxide-aluminate solution and the ethanol. Light and heavy liquid phases containing water are formed. The light or first phase has a high concentration of ethanol and has sodium hydroxide with a little aluminate. The ratio of the sodium hydroxide to the aluminate is higher than in the sodium hydroxide-aluminate solution and the ratio of sodium hydroxide to aluminate in the heavy phase. The heavy or second phase has a low concentration of ethanol and has sodium hydroxide and aluminate. The ratio of the sodium hydroxide to the aluminate is lower than in the light phase and in the sodium hydroxide-aluminate solution.

The light phase C is discharged through the pipe 14 into the still 15. The ethanol is removed from the light pase by distillation and returned to the reservoir 13 for reuse as recovered ethanol D through pipe 16 connected between the top of the still 15 and the reservoir 13. The solution with sodium hydroxide E with some aluminate is discharged at the bottom through pipe 17 and returned to the bath 9.

The heavy phase F is discharged at the bottom of the extractor 11 through pipe 18 as waste. Make-up ethanol G is added by pipe 22 to compensate for loss in the process. Chart I sets forth the quantities involved in the process.

CHART I.—AMOUNTS IN POUNDS

| | Free sodium hydroxide | Aluminum | Sodium sulfide | Water | Ethanol |
|---|---|---|---|---|---|
| A | 12,000 | 5,000 | 1,500 | 100,000 | |
| B | | | | 3,600 | 86,400 |
| C | 8,000 | 500 | 500 | 78,600 | 86,000 |
| D | | | | 3,575 | 85,784 |
| E | 8,000 | 500 | 500 | 75,000 | 100 |
| F | 4,000 | 4,500 | 1,000 | 25,000 | 400 |
| G | | | | 25 | 616 |
| Process loss | | | | 25 | 116 |

Figure 2:
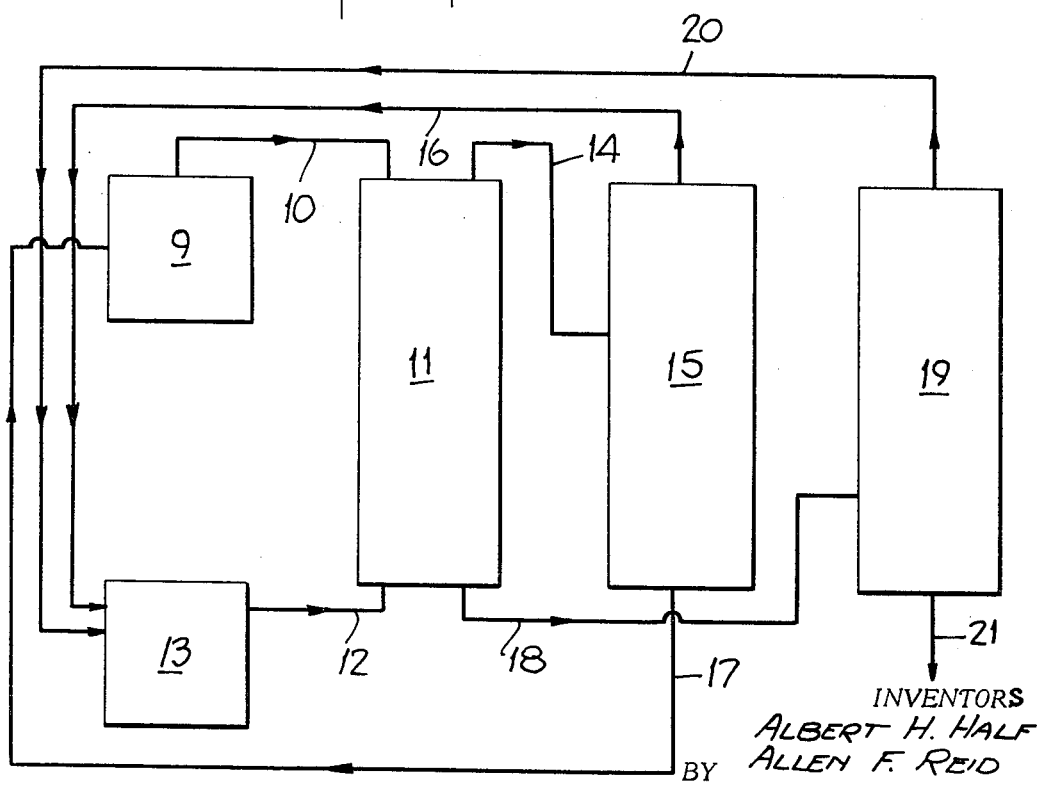
FIG. 2 diagrammatically illustrates the recovery of ethanol from both phases and sodium hydroxide from the light phase.

The embodiment of FIG. 2 is the same as the embodiment of FIG. 1 except that the pipe 18 carrying the heavy phase is connected to a second still 19 where the ethanol is driven off and returned through pipe 20 to the reservoir 13. The solution of sodium hydroxide with too much aluminate is discharged as waste through the conduit 21 at the bottom.

Figure 3:
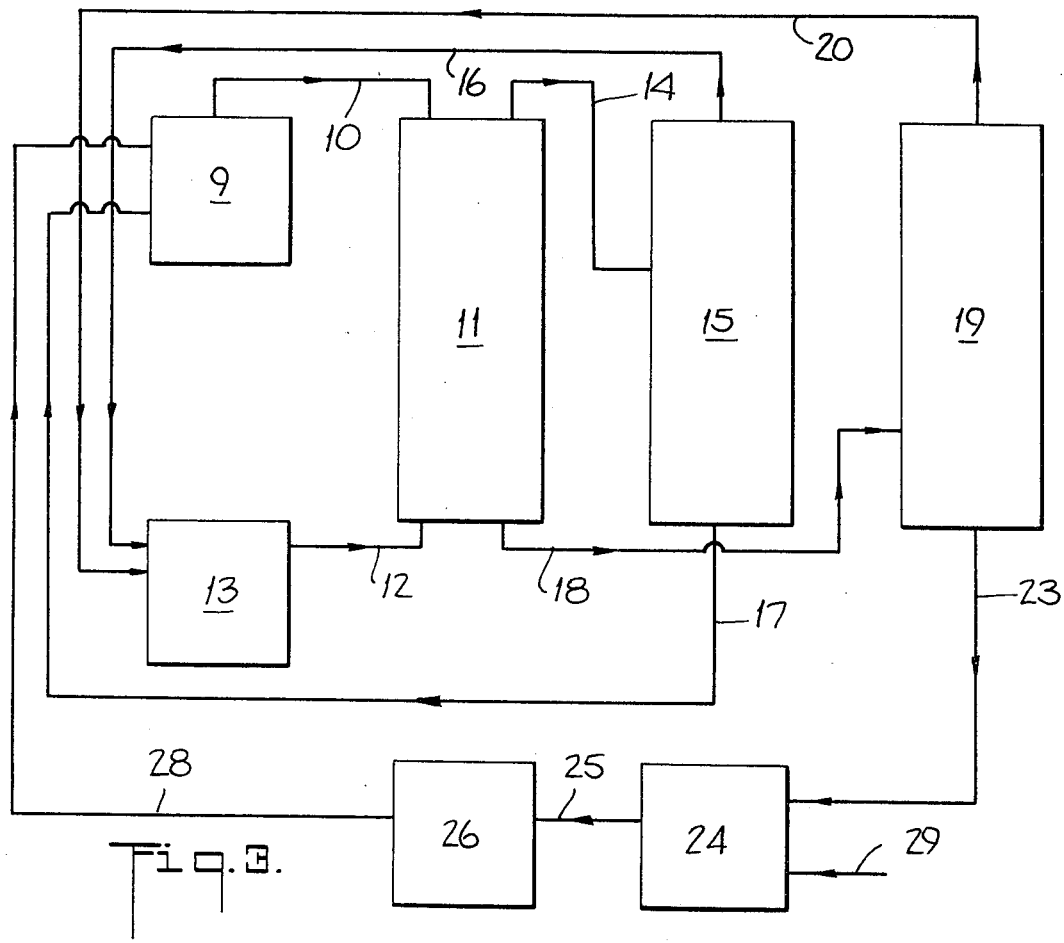
FIG. 3 diagrammatically illustrates the recovery of ethanol and sodium hydroxide from both phases.

As shown in FIG. 3 instead of discharging the sodium hydroxide with a high content aluminate, the still 19 may be connected to a settling tank, filter or centrifuge tank 24 by the transfer means 23. Water is delivered by pipe 29 to the tank 24. This precipitates a substantial amount of aluminum hydroxide. The aluminum hydroxide is removed at 24a and the solution delivered by pipe 25 to an evaporator 26. The recovered sodium hydroxide is delivered to the bath 9 by the pipe 28.

In FIG. 4 the apparatus for treating the heavy phase of sodium hydroxide solution with a high concentration of aluminate and a low concentration of ethanol H is shown. Chart II sets forth the amounts of the constituents of influents and effluents. The pipe or transfer means 18 of FIG. 1 is connected to the mixing tank 60. Water I is supplied by pipe 61 from the water reservoir 62. The mixture is transferred to the holding tank 63 by the pipe 64. A substantial amount of a solid precipitate of aluminum hydroxide slurry J is formed. The slurry J with the precipitate is delivered to the separating means 65 by the pipe 66. The separating means may be a settling, filtering or centrifuging means. The aluminum hydride precipitate or second phase K is discharged as waste through the pipe 67. The liquid filtrate L or first phase of sodium hydroxide solution with ethanol is discharged through the pipe 68 to the evaporator or still 69. Water is discharged through pipe 74 to water reservoir 62. Eethanol M with some water is discharged through pipe 70 and the concentrate N of sodium hydroxide is discharged by pipe 71 to the liquid-to-liquid extractor 11 of the embodiment of FIG. 1. Recovered caustic O and waste P are obtained. Additional recovered ethanol Q is discharged through pipe 72.

CHART II.—AMOUNTS IN POUNDS

|   | Free sodium hydroxide | Aluminum | Sodium sulfide | Water | Ethanol |
|---|---|---|---|---|---|
| H | 4,000 | 4,500 | 1,000 | 25,000 | 400 |
| I |  |  |  | 50,000 |  |
| J | 8,950 | 4,500 | 1,000 | 75,000 | 400 |
| K | 50 | 3,350 | 10 | 500 | 5 |
| L | 8,900 | 1,150 | 990 | 74,500 | 395 |
| M |  |  |  | 4 | 100 |
| N | 8,900 | 1,150 | 990 | 25,000 | 54 |
| O | 5,500 | 125 | 125 | 18,750 | 25 |
| P | 3,400 | 1,025 | 865 | 6,255 | 129 |
| Q |  |  |  | 10 | 241 |

Figure 5:
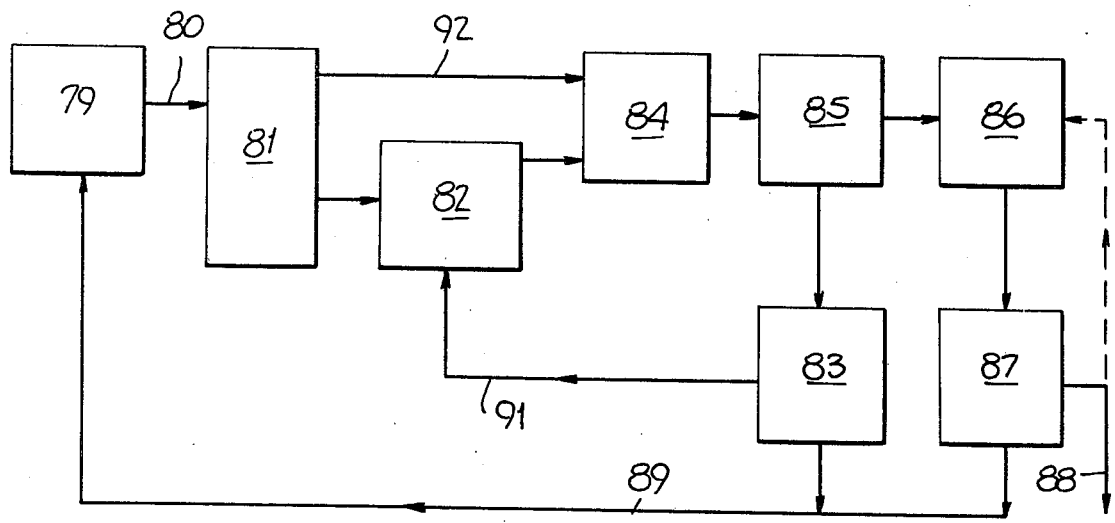
FIG. 5 diagrammatically illustrates the recovery of sodium hydroxide by methanol.

In FIG. 5 the sodium hydroxide solution R with an excess amount of aluminate is introduced from the bath 9 by pipe 40 to the mixing tank 41. Chart III sets forth the amount of the constituents of the influents and effluents. Methanol S is suppled by the pipe 42 from the methanol reservoir 43 to the tank 41. In the tank 41 the sodium hydroxide solution and the methanol are mixed and then delivered by the pipe 44 to the holding or reservoir tanks 45. A substantial part of the aluminum will precipitate as a solid aluminum hydroxide. The solution T with the precipitant is transferred by the conduit means 46 to the settling, filtrating and/or centrifuging apparatus 47. The precipitant U is discharged from the apparatus 47 through the conduit means 48 to the still or evaporators 49. The recovered methanol V is delivered by the conduit means 50 to the methanol reservoir 43 and the waste W is discharged by the conduit means 51. The filtered sodium hydroxide solution X with methanol is conveyed by the conduit means 52 from the apparatus 47 to the still or evaporator 54. The methanol Y is discharged through the conduit means 55 to the reservoir 43 and the recovered caustic Z is discharged through the conduit means 56. Make-up methanol SS is added at 57.

CHART III.—AMOUNTS IN POUNDS

|   | Free sodium hydroxide | Aluminum | Sodium sulfide | Water | Ethanol |
|---|---|---|---|---|---|
| R | 12,000 | 5,000 | 1,500 | 100,000 |  |
| S |  |  |  |  | 321,000 |
| T | 19,100 | 5,000 | 1,500 | 100,000 | 320,000 |
| U | 5,700 | 4,800 | 700 | 1,000 | 3,200 |
| V |  |  |  |  | 3,000 |
| W | 5,700 | 4,800 | 700 | 1,000 | 200 |
| X | 13,400 | 200 | 800 | 99,000 | 316,800 |
| Y |  |  |  |  | 316,200 |
| Z | 13,400 | 200 | 800 | 99,000 | 100 |
| SS |  |  |  |  | 800 |
| Process loss |  |  |  |  | 500 |

Referring to FIG. 6 the invention is also useful in recovering sodium hydroxide solution used in the purification of dry bauxite comprising 12.5% water, 57.8% $Al_2O_3$, 24.3% $Fe_2O_3$, 3.5% $SiO_2$, and 2.5% $TiO_2$. The present process for purifying the ore is the Bayer process as described in "Aluminum and Its Production" by Edwards, Frary & Jeffries, McGrau-Hill, N.Y. 1930. In this process sodium hydroxide solution is used to remove the iron, silicon and titanium oxides. The sodium hydroxide solution may be reclaimed for reuse in the process.

In FIG. 6 a diagram of reclamation is shown. The apparatus of the Bayer process is indicated at 79. The sodium hydroxide solution with a concentration of aluminate is delivered by the conduit and transfer means 80 to the filtration apparatus 81. The residue from the filtered sodium hydroxide solution with the aluminate is delivered to the filter cake tank 82. Ethanol is also delivered from the still 83 to the filter cake tank 82 by conduit means 91 and an ethanol diluent is discharged from the filter cake tank 82 to the tank 84. The filter cake is discarded after the ethanol wash. The sodium hydroxide solution with the aluminate is delivered directly by pipe 92 from the filtration 81 to the tank 84 to form a filtrate with sodium aluminate. The filtrate is mixed with the ethanol from washing the filter cake and these form a light phase and a heavy phase. The mixture is delivered to the separating tank 85 where the light and heavy phases are separated. The light or first phase is delivered to the still 83 where the ethanol is driven off and returned to the filter cake tank 82 by the conduit means 91 and the caustic discharged for reuse in the Bayer process to the transfer and conduit means 89. The heavy or second phase with the aluminate is delivered to the tank 86 where aluminum hydroxide is precipitated. The solution with the precipitate is delivered to the filtration apparatus 87 and the caustic solution is separated from the aluminum hydrate. The aluminum hydrate is discharged to pipe 88 and the recovered caustic is discharged to the transfer and conduit means 89 for reuse in the Bayer process. For the purposes of seeding the tank 86 some of the aluminum hydrate may be fed to the tank 86 as indicated by the dash lines.

In the Charts I, II and III the amounts of free sodium hydroxide are given. This excludes the sodium hydroxide in combination with the aluminum as aluminate, and is 1.48 pounds of sodium hydroxide for each pound of aluminum in solution. For the embodiments of FIGS. 1, 2, 3 and 5 the ratio of the sodium hydroxide to aluminum of the feed liquor is 3.88 to 1. In the embodiment of FIG. 6 the typical Bayer process has an atomic ratio of sodium to aluminum in the digestion liquor of 1.8 to 1. The weight ratio of sodium hydroxide to aluminum is 3.15 to 1. This includes the sodium of the aluminate, the carbonate and the hydroxide in the hydroxide amount.

For the embodiments using ethanol to recover the sodium hydroxide the aluminum may have a concentration of at least 6 parts per thousand up to 250 parts per thousand. The sodium hydroxide, free and combined, may have a concentration from 11 to 400 parts per thousand. The ratio of the sodium hydroxide to aluminum is maintained at least at 1.8 to 1.0.

For the embodiment using methanol to recover sodium hydroxide the aluminum may have a concentration of at least 2 parts per thousand to 250 parts per thousand. The sodium hydroxide, free and combined, may have a concentration from 3 parts to 400 parts per thousand. The ratio of the sodium hydroxide to aluminum is not controlling. Aluminum will precipitate slowly without methanol when the ratio approaches 1.5 to 1.0.

Although the apparatus has been shown schematically in FIGS. 1 to 6, it is of course understood that conventional apparatus is used and in the pipes, conduit and transfer means that conventional pumping apparatus or gravity may be used to transfer the solutions. Also, the foregoing description has been made in connection with sodium hydroxide. Other alkali metal hydroxides may be similarly treated and recovered.

The invention is set forth in the appended claims.

We claim:

1. A process for reducing the concentration of aluminate is an aqueous solution of an alkali metal hydroxide comprising mixing an aqueous solution of an alkali metal hydroxide containing an excessive amount of aluminate with ethanol, forming a first phase having a high concentration of ethanol and an alkali metal hydroxide and a lower concentration of an aluminate in a ratio higher than in the aqueous solution, forming a second phase having a low concentration of ethanol and an alkali metal hydroxide and an aluminate in a ratio lower than in the aqueous solution, separating said phases, distilling ethanol from the first phase and separating the alkali metal hydroxide with lower concentration aluminate in an aqueous solution.

2. A process as set forth in claim 1 wherein said alkali metal hydroxide is sodium hydroxide.

3. A process as set forth in claim 1 wherein the additional steps are provided of distilling and recovering the ethanol from said second phase.

4. A process as set forth in claim 1 wherein the additional steps are provided of distilling ethanol from the second phase and separating the alkali metal hydroxide with higher concentration of aluminate in an aqueous solution.

5. A process as set forth in claim 4 wherein additional steps are provided of adding water to the aqueous solution of alkali metal hydroxide and higher concentration of aluminate, and precipitating and separating aluminum hydroxide from the aqueous solution.

References Cited

UNITED STATES PATENTS

| 2,418,372 | 4/1947 | Smith | 23—184 |
| 2,446,868 | 8/1948 | Cunningham | 23—312 |

EDWARD J. MEROS, Primary Examiner

U.S. Cl. X.R.

23—143, 312